Figure 1:
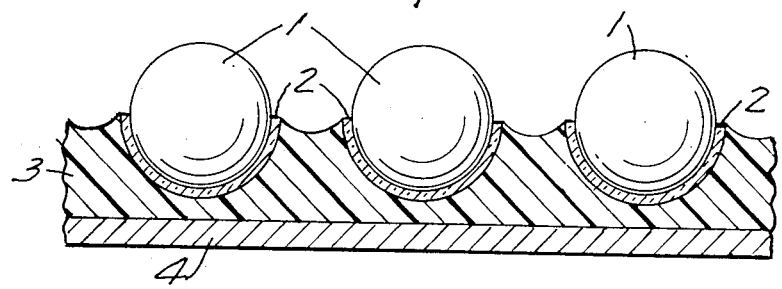

United States Patent

Bingham

[15] 3,700,305
[45] Oct. 24, 1972

[54] RETROREFLECTIVE MICROSPHERES HAVING A DIELECTRIC MIRROR ON A PORTION OF THEIR SURFACE AND RETROREFLECTIVE CONSTRUCTIONS CONTAINING SUCH MICROSPHERES

[72] Inventor: Wallace Karl Bingham, North St. Paul, Minn.

[73] Assignee: Minnesota Mining and Manufacturing Company, St. Paul, Minn.

[22] Filed: Dec. 14, 1970

[21] Appl. No.: 97,660

[52] U.S. Cl. .................. 350/105, 350/166, 350/299
[51] Int. Cl. .................................................. G02b 5/12
[58] Field of Search.............. 350/97–109, 288, 350/299, 166, 167, 2, 165

[56] References Cited

UNITED STATES PATENTS

| | | | |
|---|---|---|---|
| 2,660,925 | 12/1953 | Turner | 350/166 |
| 3,552,822 | 1/1971 | Altman | 350/167 |
| 2,713,286 | 7/1955 | Taylor | 350/105 |
| 2,700,323 | 1/1955 | Schroder | 350/166 |
| 2,543,800 | 3/1951 | Palmquist et al. | 350/105 |

*Primary Examiner*—David Schonberg
*Assistant Examiner*—Michael J. Tokar
*Attorney*—Kinney, Alexander, Sell, Steldt & Dalahunt

[57] ABSTRACT

Retroreflective constructions containing microspheres with adjacent dielectric mirrors. Also microspheres having a plurality of coatings on a portion of their surface to form a dielectric mirror thereon.

11 Claims, 2 Drawing Figures

Patented Oct. 24, 1972

3,700,305

INVENTOR.
WALLACE KARL BINGHAM
BY Kinney, Alexander,
Sell, Steldt & DeLaHunt
ATTORNEY.

RETROREFLECTIVE MICROSPHERES HAVING A DIELECTRIC MIRROR ON A PORTION OF THEIR SURFACE AND RETROREFLECTIVE CONSTRUCTIONS CONTAINING SUCH MICROSPHERES

This invention relates to novel retroreflective elements and to retroreflective constructions incorporating said elements. In one particular aspect this invention relates to novel retroreflective constructions containing spherical lens elements.

One common type of retroreflective construction contains small spherical lens elements, such as small glass microspheres or beads, and either diffusely or specularly reflecting material adjacent the rear surface thereof, the selection of refractive indices of the materials and the positioning of the respective components being made in a known manner to provide maximum retroreflective efficiency. In sheet form such microspheres have conveniently been hemispherically embedded in a suitable binder, with the reflecting material contained in the binder. Various types of specular reflecting material have been employed, including metal flakes, e.g. aluminum flakes. It is also possible to hemispherically deposit the specularly reflecting material directly onto the microsphere surface, and one particularly useful specular reflecting material is obtained by the vapor deposition of metal, e.g. aluminum, onto a hemispherical portion of a glass microsphere, as described in U.S. Pat. No. 2,963,378. Unfortunately, metallic specular reflectors have several serious disadvantages, one of which is their usual absorption of light. Additionally, some metals, such as aluminum, are subject to corrosion. Furthermore, the color of the light reflected from a retroreflective construction using a metallic specular reflector is not readily controlled, and a brilliant white is difficult to achieve, especially when aluminum is used. Colored effects are generally limited to the peculiar color characteristics of the available specular reflecting materials, unless the color is introduced into the glass beads or is contained in a top-coating over the glass beads.

It is therefore an object of the present invention to provide retroreflective elements and constructions having improved specular reflectors therein.

Another object of this invention is to provide novel retroreflective elements and constructions which are less susceptible to damage due to corrosion.

Still another object of this invention is to provide retroreflective elements and constructions which can be used to control color or produce novel visual effects.

A further object of this invention is to provide retroreflective elements and constructions having improved white light reflection.

Figure 2:
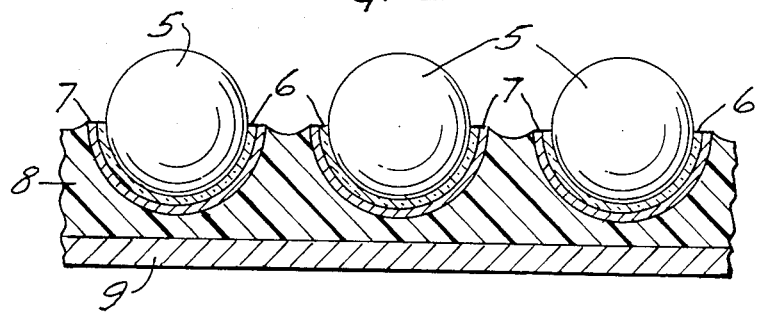

FIGS. 1 and 2 are schematic cross-sectional views illustrating two retroreflective constructions of this invention.

The advantages of this invention are achieved in a retroreflective construction having microsphere lens elements of 10 to 200 microns diameter (preferably 25 to 75 microns) and adjacent specularly reflecting material by using as the specularly reflecting material a dielectric mirror comprising a transparent layer of refractive index $n_1$, the faces of which are in contact with materials of refractive indices $n_2$ and $n_3$, both $n_2$ and $n_3$ being at least 0.1 (preferably at least 0.3) either higher or lower than $n_1$, at least the material contacting the face closest to the spherical lens element being transparent, said transparent layer having an optical thickness corresponding to odd numbered multiples (i.e. 1,3,5,7...) of about one-quarter wavelength of light in the wavelength range of about 3,800 to about 10,000 angstroms. Thus, either $n_2 > n_1 < n_3$ or $n_2 < n_1 > n_3$, and the materials on either side of the transparent layer may be either both higher or both lower in refractive index than $n_1$. When $n_1$ is higher than both $n_2$ and $n_3$, $n_1$ is preferably in the 1.7 to 4.9 range, and $n_2$ and $n_3$ are preferably in the 1.2 to 1.7 range. Conversely, when $n_1$ is lower than both $n_2$ and $n_3$, $n_1$ is preferably in the 1.2 to 1.7 range, and $n_2$ and $n_3$ are preferably in the 1.7 to 4.9 range. The resulting specular reflector thus comprises a contiguous array of materials, at least one being in layer form, having an alternating sequence of refractive indices, all except the material farthermost from the spherical lens elements being necessarily transparent. In a preferred embodiment the contiguous array has from two to seven layers, preferably three to five layers, adjacent to the spherical lens element. Desirably all light transparent materials are clear or essentially colorless to minimize light absorption and maximize light reflection, but a great variety of visual effects may be achieved, if desired, when one or more of the materials are colored.

Referring to FIG. 1, an illustrative simple retroreflective construction of the present invention comprises a small spherical lens element 1 of refractive index $n_2$, a transparent layer thereon 2 of refractive index $n_1$, a binder 3 for the spherical lens element which has a refractive index $n_3$, and a suitable backing 4. Transparent layer 2 may be hemispherically disposed on the spherical lens element, as shown, or may be coated over the entire spherical surface of the lens element. In the latter alternative, if it has a refractive index less than that of the lens element, it may also serve as an antireflection coating on that portion of the spherical lens element surface which is not embedded in the binder. When the binder 3 and the backing 4 are transparent, any light passing through transparent layer 2 can penetrate the entire construction and be viewed on the reverse side of the construction. Such may be mounted on, adhered to or positioned adjacent another surface from which light can be reflected back through the construction. For example, when a sheet of this type is placed on a wood grain surface, the effect of the grain can be seen through the sheeting, which is useful when decorative effects are desired in addition to retroreflective properties.

In FIG. 2 the retroreflective construction utilizes as a specular reflector multiple layers in an alternating sequence of refractive index. Here a spherical lens element 5 is coated with transparent layers 6 and 7 of refractive index $n_2$ and $n_1$ respectively, and the binder 8 on backing sheet 9 has a refractive index $n_3$. If more than two transparent layers are provided, the retroreflective efficiency is increased and the amount of transmitted light is accordingly reduced. That light which is transmitted through the multi-layer specular reflector will, of course, be diffusely reflected by any filler, pigment, dye, metal flakes, etc. in the binder or in the backing sheet, creating special visual effects.

Coating alternating layers of high and low refractive index dielectric materials to produce reflection by phase agreement or enhancement of the light reflected at the several interfaces is well known in the area of optical instrumentation, such band pass filters, interference filters, dichroic mirrors, and thin film polarizers, such as indicated in *Scientific American*, Vol. 223, No. 6 (December 1970) pages 59–75. However, to applicant's best knowledge this technology has never been considered for use in reflexreflective constructions, particularly when specular reflecting materials are used in conjunction with very small spherical lens elements. In fact, the theory of optical interference films is based on flat surfaces. Although it is also known to be applicable to surfaces with relatively large radii of curvature, i.e. above radius of curvature in the neighborhood of 0.1 inches (2.5 mm), the established theory would not predict that enhancement or reinforcement of reflection would be effective at much smaller radii of curvature and, indeed, the predicted intensity distribution patterns created by wave front division in concentric curved surfaces of small radii of curvature would be expected to destroy, or at least seriously reduce, the desired enhancement of specular reflection.

Among the many water insoluble compounds that may be used in providing transparent materials within the desired refractive index range are: high index materials such as $CdS$, $CeO_2$, $CsI$, $GaAs$, $Ge$, $InAs$, $InP$, $InSb$, $ZrO_2$, $Bi_2O_3$, $ZnSe$, $ZnS$, $WO_3$, $PbS$, $PbSe$, $PbTe$, $RbI$, $Si$, $Ta_2O_5$, $Te$, $TiO_2$; low index materials such as $Al_2O_3$, $AlF_3$, $CaF_2$, $CeF_3$, $LiF$, $MgF_2$, $Na_3AlF_6$, $ThOF_2$, elastomeric copolymers of perfluoropropylene and vinylidene fluoride (refractive index of ≈1.38), etc. Where water insolubility is not important, still other materials (e.g. $NaCl$) can be used. Others are reported in *Thin Film Phenomena*, K. L. Chopra, page 750, McGraw-Hill Book Company, New York, (1969). They may be conveniently positioned or formed on the spherical lens elements after the lens elements have been temporarily essentially hemispherically embedded into a heated plastic coated web, e.g. polyethylene coated paper, by vapor deposition onto the exposed lens surfaces in one or more steps to provide the desired number of layers in an alternating sequence of refractive indices. If it is desired to position the specular reflector a predetermined distance from the surface of the spherical lens element, an intervening transparent space coating or layer may first be provided on the lens element surface, as described in U.S. Pat. No. 2,407,680.

Still another advantage of the retroreflecting elements of the present invention resides in the ability to provide on the glass microsphere a dielectric mirror construction which will selectively reflect only a portion of light in the visible spectrum (e.g. a dielectric narrow band pass filter) providing transmission of visible light in the pass band width and reflection of visible light outside the pass band. Such dielectric mirror constructions are of the type described in the literature for use as bandpass filters. One convenient type of dielectric mirror construction with reflecting characteristics in only a portion of the visible spectrum is described in the article in *Scientific American* entitled "Optical Interference Coatings," by Phillip Baumeister and Gerald Pincus, pages 59 – 75 (December 1970), wherein two quarter wavelength stacks, each of which has layers of alternating refractive indices (i.e. two dielectric mirrors), both preferably having the same number of quarter wavelength layers and also having a significant transmission component are separated by a spacer layer which is of an optical thickness equal to a quarter wavelength of the light to be transmitted. With such constructions on the microspheres of this invention it is possible to provide retroreflecting microspheres which have controlled color retroreflection and which accordingly have a limited and colored transmission component. For example, if a glass microsphere is provided with two spaced dielectric mirrors, as described above, which provide a pass band response narrowly limited to the green portion of the visible spectrum, the retroreflected component would comprise the remainder of the visible spectrum (i.e. red and blue, or magenta). The green light transmitted through the retroreflective microsphere can be utilized to assist in viewing by diffuse reflection.

Unlike aluminum the specular reflectors in this invention do not necessarily absorb significant amounts of the incident light, although a fraction of the light is usually transmitted. As mentioned earlier, the greater the number of alternating materials or layers, the higher the reflection and the lower the transmission of light. As many as 40 to 50 alternating layers may be used, but five to seven layers are sufficient to produce 90 – 98 percent efficiency of reflection. The fact that a lesser number of layers produces lesser reflection and proportionately higher light transmission can also be used to advantage when the transmitted light contacts diffuse reflecting material, such as fluorescent or other colored pigment, in the backing or microsphere binder material, resulting in improved diffuse reflection when such retroreflective microspheres are contained in sheeting designed for viewing under ordinary lighting as well as for viewing retroreflectivity.

EXAMPLE 1

A web of paper coated on one side with low density polyethylene was covered on the polyethylene side with a monolayer of glass beads having a refractive index of 1.93 and a diameter ranging from 45 to 70 microns. These beads were embedded in the polyethylene to a depth of approximately 30 to 40 percent of their diameters by heating the web to 280° F.(138° C.). The exposed bead side of the web was vacuum vapor coated with $Na_3AlF_6$ (refractive index of 1.35–1.39) to form a first layer, then vacuum coated with $Bi_2O_3$ (refractive index of about 1.92) to form a second layer, both layers being about one-quarter wavelength in optical thickness, as determined at 5,500 angstroms. The coated beads were coated (10 mil wet thickness) with a slurry of fluorescent pigment (37.5 weight percent) and alkyd resin (38.6 weight percent) binder in 20.8 weight percent xylol and 3.1 weight percent butanol, and the coating was cured at 150° F.(66° C.) for 5 minutes and 200° F.(93° C.) for 12 minutes. Onto the fluorescent coating was coated a white pigmented adhesive coating composition containing 7.9 parts by weight titanium dioxide, 3.4 parts of a thermoplastic, highly crystalline polyurethane resin, 14.6 parts of dioctyl phthalate plasticizer, and 21.8 parts of vinyl chloride-vinyl acetate copolymer (87 weight percent and 13 weight percent, respectively) in 18.7 parts toluol, 25.7 parts methylethylketone and 7.2 parts of dimethylformamide, the wet coating thickness being 6 mils. After this coating was dried for 3 minutes at 150° F.(66° C.) and 10 minutes at 200° F.(93° C.), the web was hot laminated at 30 psi (2.1 kg/cm$^2$) and 210° F.(99° C.) to an adhesive coated cotton cloth, the adhesive being a plasticized vinyl chloride-vinyl acetate copolymer (87 weight percent and 13 weight percent, respectively). Finally, the polyethylene coated paper was stripped from the beads, exposing the bead surfaces. The resulting product was highly fluorescent, had a retroreflective intensity of 135 candella per square meter per lux and retained the hand and feel of the cotton cloth.

EXAMPLE 2

A construction identical to that in Example 1 was prepared, except for the omission of the $Bi_2O_3$ step. The final construction was exceptionally fluorescent in appearance and had a retroreflective intensity of 24.5 candella per square meter per lux (approximately 65 times that of white paint).

EXAMPLE 3

A construction identical to that in Example 1 was prepared, except the slurry which was coated directly onto $Bi_2O_3$ contained $TiO_2$ white pigment (7.9 parts by weight) instead of fluorescent pigment and the binder was a mixture of 10.3 parts of a thermoplastic, highly crystalline polyurethane resin and 7.9 parts of vinyl chloride-vinyl acetate copolymer (86 weight percent vinyl chloride, 13 weight percent vinyl acetate, 1 percent dibasic acid) in 29.6 parts of methylethylketone and 35.2 parts of dimethylformamide. The resultant cloth was a white, durable, drapable, retroreflective cloth having a retroreflective intensity of 139 candella per square meter per lux.

The following test procedure was used in determining retroreflective intensity. A light projector having a maximum lens diameter of 1 inch and capable of projecting a uniform light is used to illuminate the sample. The light falling on the sample has a color temperature of 2,854° K. The light reflected from the test surface is measured with a photoelectric receiver whose response has been corrected for the color sensitivity of the average phototopic human eye. The dimensions of the active area on the receiver are such that no point on the perimeter is more than one-half inch from the center. Samples were mounted on a flat black test surface approximately 3 feet square (0.836 square meters). The sample was 50 feet (14.25 meters) from the projector lens and the receiver. The area of the test sample was 1 square foot (0.0929 square meter). The illumination incident on the test surface and the illumination incident on the receiver due to reflection from the test surface was measured at 5° incident angle and 0.2° divergence angle. The reflective intensity in candlepower per square foot per foot candle (equivalent to candella per square meter per lux), was then computed from the following equation:

$$R = Er\,(d^2)/Es\,(A)$$

Where:
$R$ = Retroreflective Intensity
$Er$ = Illumination incident upon the receiver
$Es$ = Illumination incident upon a plane perpendicular to the incidence ray at the specimen position, measured in the same units as $Er$
$d$ = Distance in feet from the specimen to the projector
$A$ = Area in square feet of the test surface These retroreflective intensities represent the effect of a light beam passing into and out of a retroreflective glass bead so that any surface or interfacial effects are thus doubled. The above procedure is embodied in United States Federal Specification No. L–S–300A Jan. 7, 1970) as a test for "reflective intensity."

What is claimed is:

1. A retroreflective construction having spherical lens elements of 10 to 200 microns diameter and having specular reflectors adjacent said lens elements, said specular reflectors comprising a transparent layer of refractive index $n_1$, the faces of said layer being in contact with materials of refractive index $n_2$ and $n_3$, both $n_2$ and $n_3$ being at least 0.1 either higher or lower than $n_1$, at least the material contacting that face most adjacent to said spherical lens element being transparent, said transparent layer having an optical thickness corresponding to an odd numbered multiple of about one-quarter wavelength of light in the wavelength range of about 3,800 to 10,000 angstroms.

2. The retroreflective construction of claim 1 in which said specular reflectors comprise a plurality of transparent layers having successively alternating refractive indices of at least 0.1 difference.

3. The retroreflective construction of claim 2 wherein the said successively alternating refractive indices have at least 0.3 difference.

4. The retroreflective construction of claim 2 in which the plurality of transparent layers comprises from two to seven layers adjacent said spherical lens elements.

5. The retroreflective construction of claim 1 wherein said material of refractive index $n_2$ is the material of said spherical lens elements.

6. The retroreflective construction of claim 5 in which said material of refractive index $n_3$ is a binder for said lens elements.

7. The retroreflective construction of claim 5 in which the material of refractive index $n_3$ is a second transparent layer having an optical thickness corresponding to that of the other transparent layer.

8. The retroreflective construction of claim 1 in which $n_1$ is in the 1.7 to 4.9 range and $n_2$ and $n_3$ are both in the 1.2 to 1.7 range.

9. The retroreflective construction of claim 1 in which $n_1$ is in the 1.2 to 1.7 range and $n_2$ and $n_3$ are both in the 1.7 to 4.9 range.

10. The retroreflective construction of claim 1 in which said spherical lens elements and adjacent specular reflectors are partially embedded in a binder containing a diffuse reflecting material.

11. Retroreflective microspheres having a diameter between 10 and 200 microns and a refractive index $n_2$ and having on about a hemispherical portion of the surface thereof at least two transparent layers with an optical thickness corresponding to an odd numbered multiple of about one-quarter wavelength of light in the wavelength range of about 3,800 to 10,000 angstroms, the transparent layer most adjacent said microsphere having a refractive index of $n_1$ and the next adjacent transparent layer having a refractive index of $n_3$, $n_1$ being at least 0.1 greater or less than both $n_2$ and $n_3$.

* * * * *